Patented Oct. 20, 1931

1,827,737

UNITED STATES PATENT OFFICE

JOSEPH R. COOLIDGE, 3D, OF BROOKLINE, MASSACHUSETTS, ASSIGNOR TO MONTAN, INC., OF BOSTON, MASSACHUSETTS, A CORPORATION OF MASSACHUSETTS

SELF-LUBRICATING BEARING AND METHOD OF MAKING SAME

No Drawing. Application filed December 23, 1927. Serial No. 242,299.

This invention relates to bearings, bearing bushings, stub shafts, guides, and other bearing members which are subjected to friction and which carry their own supply of lubricant. For convenience such parts will be hereinafter referred to as "bearing members." The invention is especially concerned with bearing members made of wood or fibre (wood and fibre being equivalents, so far as this invention is concerned) and often referred to as oilless bearings or self-lubricating bearings.

Self-lubricating wooden bearing bushings have been used heretofore for many years and have attained a considerable degree of success for certain purposes. Their usefulness, however, has been restricted by the fact that they are relatively soft, the treatment which renders them self-lubricating having the effect of softening the wood and reducing its resistance to compression and distortion. The present invention deals with this problem and it aims to improve the bearing properties of self-lubricating wooden bushings or similar parts, and to produce wooden bearing members which will be harder than the untreated wood.

It is also an object of the invention to devise a self-lubricating bearing bushing of wood or fibre which will contain a greater proportion of lubricating material than prior articles of this type.

The invention involves both a new product and also a novel process.

I have discovered that these objects can be realized by the impregnation of wooden bearing members with lubricating material associated with a high melting point wax, Montan wax being preferred.

The exact lubricating materials chosen and the proportions of these materials to the Montan wax used will depend somewhat on the nature of the material being treated, and more especially on the results desired. I have used successfully impregnating mixtures containing from 20% of Montan wax and 80% of lubricating material to 80% of Montan wax and 20% of lubricant, and for some purposes an even wider range of percentages is permissible. For most purposes I prefer to use as the lubricant approximately equal parts of high-grade lubricating oil and paraffin wax, although some lubricant which is solid at normal temperatures but has a low melting point, such for example as a hard grease, can be substituted for all or a part of the paraffin wax. I consider it preferable, however, to use a lubricating oil or grease which has a paraffin base, particularly if paraffin also is to be a constituent of the impregnating compound. According to the preferred practice the bearing members are first shaped roughly before being impregnated. They are then submerged in the impregnating compound which may consist, for example, of twenty parts of Montan wax, forty parts of paraffin, and forty parts of lubricating oil, and they are kept submerged for several hours, say from four to eight hours, while the compound is maintained at a temperature of from, say, 200° to 220° F. Preferably the compound is at approximately atmospheric pressure during this time. This step in the process drives out the air and moisture from the pores and cells of the wood.

The process is most conveniently carried out in a pressure tank such as that used in impregnating wood, and at the conclusion of the step just described a relatively low pressure is applied and is gradually stepped up until it reaches a relatively high value, say for example, two hundred pounds per square inch, the temperature being maintained approximately as above stated. The pressure period may vary considerably, but for wooden parts of the usual sizes four or five hours is ample, the pressure being kept at, say, twenty-five pounds during the first hour, two hundred pounds during the last hour, and at suitably graded intermediate steps during the intervening period.

At the conclusion of the pressure treatment the pressure is released, the impregnating liquid is drained off, and the bearing members are removed from the tank and allowed to drain and cool. Usually these bearing members are made of maple, and the treatment above described will force a quantity of impregnating compound into the wood equivalent to from about 40% to 55% of the weight of the wood. This is ample, and a lighter impregnation is sufficient for a great many purposes. A treatment such as that just described produces a through and through impregnation of maple pieces even larger than those ordinarily used for bearing members, and I prefer to produce an impregnation of this character. At the same time it may be sufficient for a great many purposes not to make as thorough an impregnation but to force the impregnating compound into the wood for a more or less limited distance. It should, however, in any event, penetrate the wood for at least one-eighth or one-quarter of an inch, and a through and through impregnation is far more desirable.

For some purposes it may be satisfactory to finish the shaping operations on the bearing members before they are impregnated. Usually, however, it is preferable to partially shape the members, then to perform the impregnating process, and when this process has been completed to finish the parts. This is preferable partly because the wooden members may be warped slightly by the impregnating treatment, and partly, also, because the finished wooden parts can be machined or worked more accurately than the untreated wood.

A treatment such as that above described materially increases the hardness of the wood and its resistance to penetration, compression, or distortion. This effect can be made even more pronounced by using a greater proportion of Montan wax in the impregnating compound. In making self-lubricating wooden bearing members heretofore it has been a common practice to so shape or construct the wooden member that the bearing pressure would be applied chiefly to the end of the grain. This practice can also be followed in making bearing members according to the present invention, but the process provided by this invention increases the hardness of the wood to such an extent that it is not necessary to use the edge grain construction for most purposes. A sufficient proportion of Montan wax should be used in the compound to give the desired degree of hardness and to seal the lubricating material in the pores and cells of the wood at ordinary temperatures. This wax is particularly valuable in the compound for these two purposes. Important characteristics of the wax which make it of particular value in wooden bearings are its high melting point (between 180° and 200° F.) and the fact that as its temperature is raised it remains hard and brittle until its melting point is almost reached and it then passes very abruptly from a solid to a liquid state. Furthermore, this wax has the additional property of penetrating wood with remarkable ease considering its high melting point. It is readily miscible with lubricating oil, paraffin, or melted greases, and it has the property of holding in the wood an exceptionally large proportion of lubricant.

While lubricating oil could be used with the Montan wax without the presence of paraffin wax or a hard grease, I find it advantageous to use either paraffin or a hard grease with the lubricating oil and Montan wax. The combination appears to penetrate the wood more freely so that a better impregnation is effected and a more satisfactory final product is produced.

It will be understood that the particular process above described is given rather by way of illustration than limitation. It produces entirely satisfactory results, but the treatment necessarily will be varied with the condition of the wood as to moisture, the species of the wood, and the character of the service to which the bearing member is to be applied. These factors will be readily understood by those skilled in the art of wood impregnation.

An important characteristic of the process provided by this invention is the ability to adjust the melting point of the impregnating compound to the nature of the bearing or the service required of the bearing. That is, if the bearing is used for only relatively slow speed work or light loads where the temperatures are low, an impregnating compound may be used in which the proportions of oil and paraffin, or both, are relatively high, while the percentage of Montan wax is low, so that the lubricant will begin to flow at very low temperatures sufficiently to maintain good operating conditions. On the other hand, if the bearing is to be subjected to high temperatures or is operated at high speeds or under heavy loads, the proportion of Montan wax can be increased in the impregnating compound and the percentage of paraffin or oil, or both, reduced. In this way the temperature at which the impregnating compound will soften at the bearing surface can, if desired, be made considerably higher than the melting point of the paraffin itself. This characteristic makes the bearings provided by this invention suitable for use at higher speeds than prior wooden bearings, and under a greater variety of conditions than the wooden bushings treated in the usual way. A bearing made by this process and fitted too tightly, if simply allowed to run will, after a time, acquire an exceedingly satisfactory bearing surface, although it may become very hot, smoke, and carbonize to some extent in arriving at this point. Thereafter it will, however, give excellent service and require no attention for a long period of time.

While Montan wax is the best medium which I have discovered to use in increasing the hardness of the wood and holding the lubricant in the wood, it is possible to use other high melting point waxes having similar characteristics. For example, candellila and carnauba waxes have high melting points and the characteristic of passing abruptly from a solid to a liquid state upon melting. They can be used to replace the Montan wax either wholly or in part. They are not, however, quite as satisfactory as Montan wax, and they have the disadvantage of being much more expensive. One grade or variation of Montan wax is known on the market as romalin wax. It has essentially the same characteristics as Montan and is the equivalent of Montan wax for present purposes. In fact, it is essentially Montan wax under a different name.

The invention produces a very superior self-lubricating bearing member, both because of its increased hardness and resistance to distortion, and also because it carries an unusually large supply of lubricating material. The treatment makes the members waterproof to an exceptionally high degree so that there is no danger of the treated parts shrinking, swelling, or warping to any appreciable degree with changes in humidity. Due to the fact that the lubricating material is sealed in the wood with a high melting point wax, this material will not ooze or exude from the wood even at relatively high atmospheric temperatures, so that the lubricating material is retained almost indefinitely in the bearing members.

The process above described can also be used successfully in impregnating self-lubricating bearing members made of fibre such, for example, as the vulcanized fibre which is used to some extent in the manufacture of bearing bushings and the like.

Having thus described my invention, what I desire to claim as new is:

1. A self-lubricating bearing member of wood or fiber impregnated for a substantial depth with a mixture of paraffin, a lubricating oil, and a wax having a melting point above 160° F. and having the characteristic of changing abruptly from a solid to a liquid state upon melting.

2. A self-lubricating bearing member of wood or fiber impregnated for a substantial depth with a mixture of paraffin, a lubricating oil and Montan wax.

3. A self-lubricating bearing member of wood or fiber impregnated for a substantial depth with a lubricating oil, a low melting point wax, and another wax having a melting point above 160° F. and having the characteristic of changing abruptly from a solid to a liquid state upon melting.

4. That improvement in methods of making self-lubricating bearing members of wood or fiber which consists in roughly shaping the member, subsequently impregnating the members for a substantial depth with a melted mixture of lubricating material and a high melting point wax having the characteristic of changing abruptly from a solid to a liquid state upon melting, using a sufficient proportion of the wax to seal the lubricant in the pores and cells of the members upon cooling, and after the impregnated members have cooled, shaping them to substantially their final form.

5. That improvement in methods of making self-lubricating bearing members of wood or fiber which consists in forcing air and water vapor out of the pores and cells of the bearing members, then forcing into said pores and cells a melted mixture of lubricating material and a wax having a melting point above 160° F. and having the characteristic of changing abruptly from a solid to a liquid state upon melting, and using a sufficient proportion of said wax to seal the lubricant in said pores and cells upon cooling.

6. That improvement in methods of making self-lubricating bearing members of wood or fibre which consists in forcing into the pores and cells of the member for a substantial depth a melted mixture of lubricating material and Montan wax, and controlling the temperature at which the mixture will soften on the bearing surface by varying the proportions of said wax and lubricant.

7. A self-lubricating bearing member of wood or fibre impregnated for a substantial depth with a lubricant and a sufficient proportion of Montan wax to seal the lubricant in the wood at normal atmospheric temperatures.

8. A self-lubricating bearing member of wood or fibre impregnated for a substantial depth with a lubricating oil, a lubricant which is solid at normal atmospheric temperatures but which has a low melting point, and a sufficient proportion of Montan wax to hold said lubricating materials in the wood at normal atmospheric temperatures.

JOSEPH R. COOLIDGE, III.